(12) United States Patent
Miyama

(10) Patent No.: US 8,240,542 B2
(45) Date of Patent: Aug. 14, 2012

(54) GROOVING SUPPLY DEVICE FOR FLUX CORED WIRE SOLDER

(75) Inventor: Chiaki Miyama, Tokyo (JP)

(73) Assignee: Japan Unix Co., Ltd., Tokyo (JP)

(*) Notice: Subject to any disclaimer, the term of this patent is extended or adjusted under 35 U.S.C. 154(b) by 0 days.

(21) Appl. No.: 13/005,992

(22) Filed: Jan. 13, 2011

(65) Prior Publication Data

US 2011/0198387 A1 Aug. 18, 2011

(30) Foreign Application Priority Data

Feb. 18, 2010 (JP) .................. 2010-033627

(51) Int. Cl.
B23K 35/40 (2006.01)

(52) U.S. Cl. .................................. 228/56.3

(58) Field of Classification Search ............... 228/56.3
See application file for complete search history.

(56) References Cited

FOREIGN PATENT DOCUMENTS

| JP | 08281469 A | * 10/1996 |
| JP | 2003-200290 | 7/2003 |
| JP | 2007-290026 | 8/2007 |

OTHER PUBLICATIONS computer english translation of JP 08281469 A.*

* cited by examiner

Primary Examiner — Jessica L Ward
Assistant Examiner — Erin Saad
(74) Attorney, Agent, or Firm — Fitch, Even, Tabin & Flannery, LLP

(57) ABSTRACT

A first roller is arranged on one side of a transfer path for transferring flux cored wire solder, and a second roller is arranged on the other side. The first roller has on its outer circumference a guide groove in which the wire solder is fitted. The second roller is provided, with a grooving blade and a feed blade closely contacted to each other. The grooving blade comprises a continuous blade edge on the outer circumference, and the feed blade has on its outer circumference a plurality of engaging claws intermittently formed at a constant pitch. The second roller is driven and rotated to thereby advance and retract the wire solder by means of the feed blade, and thus the wire solder is grooved by the grooving blade.

12 Claims, 6 Drawing Sheets

GROOVING SUPPLY DEVICE FOR FLUX CORED WIRE SOLDER

CROSS REFERENCE TO RELATED APPLICATIONS

This application claims priority to Japanese Patent Application No. 2010-033627, filed on Feb. 18, 2010, which is incorporated by reference herein in its entirety.

TECHNICAL FIELD

The present invention relates to a grooving supply device for flux cored wire solder which applies a grooving process to a flux cored wire solder and is used for transferring the grooved wire solder toward an object to be soldered.

BACKGROUND OF THE ART

Description of the Related Art

Wire solder for soldering electronic components contains flux for the purpose of increasing the surface tension of the molten solder, preventing generation of oxides, and increasing the wettability and diffusivity of solder. The melting point of flux is lower than the melting point of solder, and therefore, when wire solder is heated by the heat of a soldering tip in soldering, the flux is evaporated, whereby the wire solder rapidly expands to cause a phenomenon like an explosion. The evaporated flux and the melted solder are splashed around to adhere to a printed board and electronic components, and there arises a problem that defective products are produced.

In order to solve the above problem, Patent Document 1 (Japanese Patent Application Laid-Open No. 2003-200290) and Patent Document 2 (Japanese Patent Application Laid-Open No. 2007-290026) disclose a technology of cutting a groove, which is deep enough to reach flux, into a side surface of wire solder immediately before soldering by means of a rotating grooving blade and allowing evaporated flux to escape through the groove to thereby prevent the explosion phenomenon. In those prior arts, the disc-shaped grooving blade and a guide roller having a v-shaped guide groove provided on the outer circumference are used, and the groove is cut into the side surface of the wire solder fitted in the V-shaped groove of the guide roller, by means of the grooving blade. The wire solder is fed by utilizing the frictional force generated when the groove is cut with the grooving blade, or by rotating the guide roller by means of a motor.

However, in the above prior art, since a slip easily occurs between the wire solder and the guide roller or the grooving blade, it is very difficult to stably transfer the wire solder only by a necessary length while a grooving process is applied to the wire solder.

Especially, in an automatic soldering machine which performs soldering automatically, after one soldering point is soldered, a soldering iron is moved for the next soldering. In order to prevent wire solder from being melted by the heat of the soldering tip before soldering the next soldering point, it is essential to retract the wire solder by a constant distance (for example, 3 to 5 mm), and to keep the interval for heat insulation purposes between the wire solder and the soldering tip. However, in the above prior arts, it is almost impossible to retract wire solder that once grooved. Thus, the prior art cannot be applied as they are to the automatic soldering machine.

SUMMARY

Thus, an object of the present invention is to provide a grooving supply device for flux cored wire solder, which can reliably apply a grooving process to the wire solder and can reliably and stably advance and retract the grooved wire solder only by a necessary amount.

In order to solve the above problems, the grooving supply device of the present invention includes a first roller and a second roller. The first roller is provided on one side of a transfer path for transferring flux cored wire solder and arranged rotatably about a first axis line perpendicular to the transfer path. The second roller is provided on the other side of the transfer path and arranged rotatably about a second axis line parallel to the first axis line.

The first roller has a guide groove on its outer circumference in which the wire solder is fitted. The second roller has a grooving blade for grooving a side surface of the wire solder and a feed blade, which engages the wire solder to advance and retract the wire solder, the grooving blade and the feed blade being adjacent to each other along the second axis line. The grooving blade has continuous blade edges on the outer circumference, and the feed blade has on its outer circumference engaging claws intermittently formed at a constant pitch.

In the present invention, it is preferable that a blade-edge circle connecting the tip ends of the engaging claws of the feed blade has a diameter smaller than a diameter of a blade-edge circle formed by a blade edge of the grooving blade.

Further, it is preferable that the grooving blade and the feed blade are arranged in a state of being closely contacted to each other.

In this case, the following constitution may be adopted. Namely, the grooving blade and the feed blade are separately formed. The respective contact surfaces of the grooving blade and the feed blade, which are in contact with each other, are planes perpendicular to the first axis line or the second axis line. The respective outer surfaces of the grooving blade and the feed blade, which are on the opposite side of the contact surfaces, gradually incline in a direction approaching the contact surfaces toward the blade edge.

Alternatively, the following constitution may be adopted. Namely, the second roller is formed with a grooving roller and a feed roller which are disposed concentrically with the respective tip end surfaces thereof being in contact with each other, the grooving blade is formed at an end portion on a side of the tip end surface of the grooving roller, and the feed blade is formed at an end portion on a side of the tip end surface of the feed roller.

Further, an angle formed by the contact surface and the outer surface of the grooving blade and an angle formed by the contact surface and the outer surface of the feed blade may be equal to each other.

The shape of the tip end of the engaging claw of the feed blade is preferably a circular arc.

In the present invention, wire solder is transferred by a feed blade including intermittent engaging claws, and the wire solder is grooved by a grooving blade including a continuous blade edge. Therefore, the wire solder can be reliably and stably transferred only by a necessary amount, and, at the same time, a grooving process can be reliably applied to the wire solder. Especially, the wire solder that once grooved can be reliably retracted by the feed blade only by a necessary amount.

A second roller is provided with both the feed blade and the grooving blade, and the second roller has both a function of feeding the wire solder and a function of grooving the wire solder, and consequently, the grooving supply device can have a very simple and rational design structure

DETAILED DESCRIPTION

Figure 1:
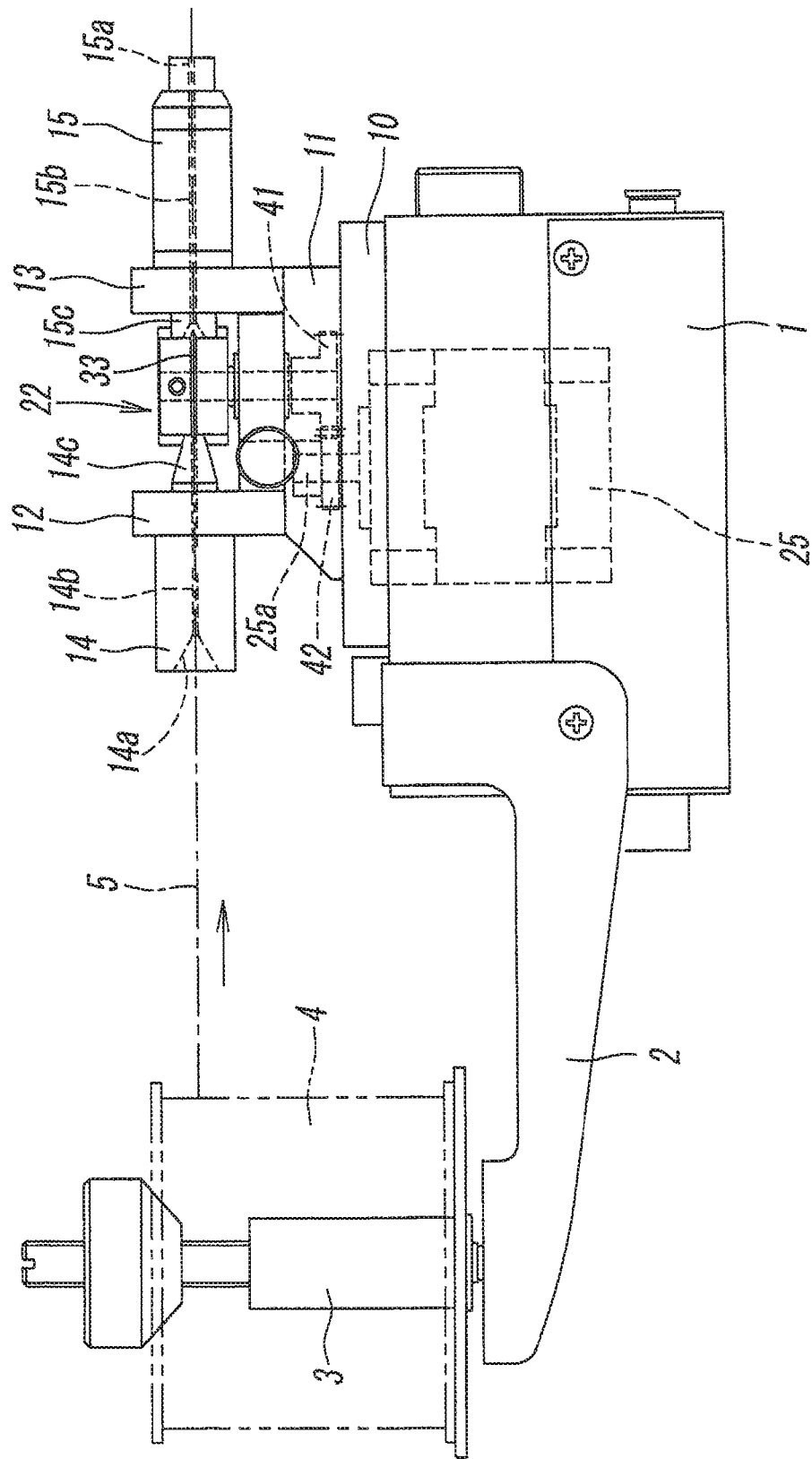
FIG. 1 is a side view showing the overall configuration of an embodiment of a grooving supply device according to the present invention.
Figure 2:
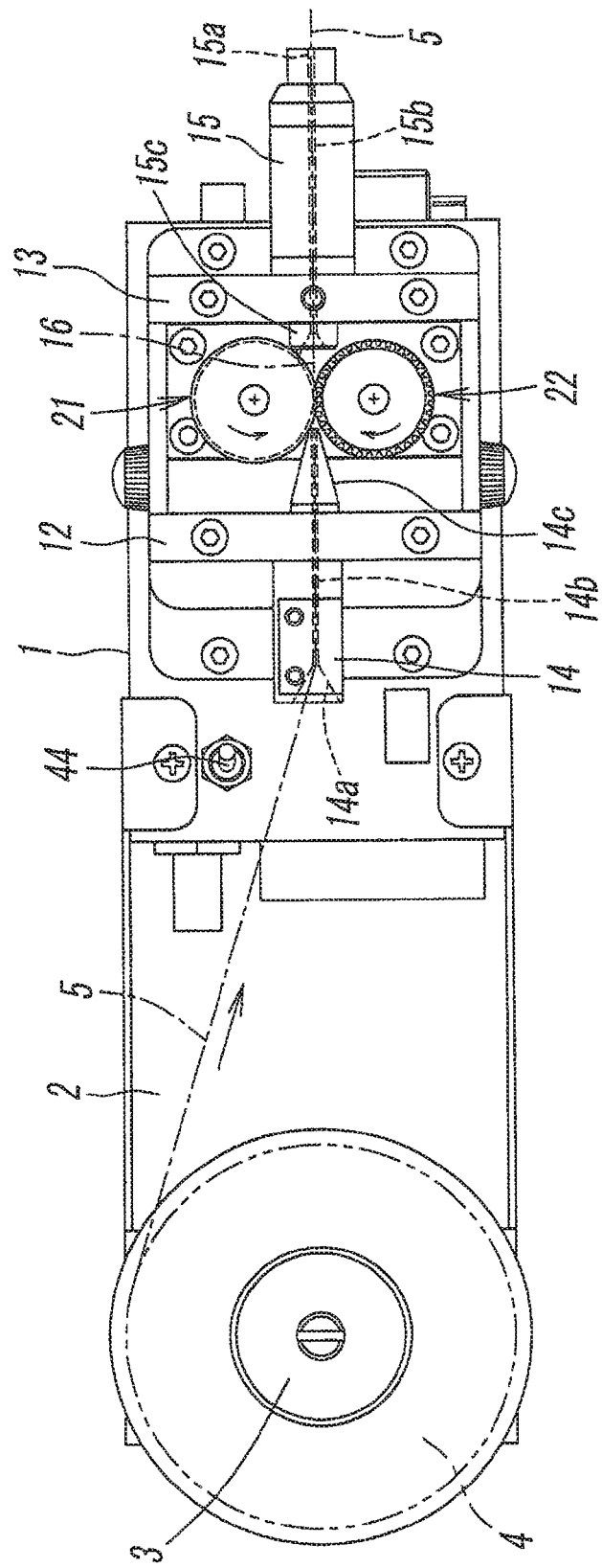
FIG. 2 is a plan view of FIG. 1.

FIGS. 1 and 2 show a grooving supply device for flux cored wire solder according to the present invention. The grooving supply device has a case 1 having a rectangular box shape. An arm 2 extends from one end of the case 1, and a reel fitting shaft 3 is rotatably attached to the tip end of the arm 2. A solder reel 4 is mounted on the reel fitting shaft 3, and wire solder 5 filled with flux 6 (see, FIGS. 5 and 6) at its core is wound around the solder reel 4.

A lid plate 10 and a bedplate 11 are overlapped and fixed onto one surface of the case 1 (the top surface in FIG. 1). Two nozzle mounting members 12 and 13 are mounted on the bedplate 11 at a distance from each other. The nozzle mounting member 12 has at one side an inlet nozzle 14, and the nozzle mounting member 13 has at one side an outlet nozzle 15. The inlet nozzle 14 introduces the wire solder 5 drawn out from the solder reel 4 from a solder feed port 14a. The outlet nozzle 15 guides the wire solder 5, fed from the inlet nozzle 14, from a solder guide port 15a toward an object to be soldered.

The inlet nozzle 14 and the outlet nozzle 15 are cylindrical members having linear solder-inserted holes 14b and 15b inside them, and they are arranged while maintaining an interval therebetween so that the solder-inserted hole 14b and the solder-inserted hole 15b are concentric to each other. According to this constitution, a linear transfer path 16 for transferring the wire solder 5 is provided in a portion ranging from the solder feed port 14a of the inlet nozzle 14 to the solder guide port 15a of the outlet nozzle 15.

In FIG. 1, a delivery port 14c is attached to the nozzle mounting member 12 and is used for delivering the wire solder 5 from the inlet nozzle 14 toward the outlet nozzle 15. A receiving port 15c is attached to the nozzle mounting member 13 and is used for receiving the wire solder 5 into the outlet nozzle 15.

The delivery port 14c is tapered gradually toward the outlet nozzle 15. The solder feed port 14a of the inlet nozzle 14 is also tapered so as to be widened toward the entrance.

Figure 3:
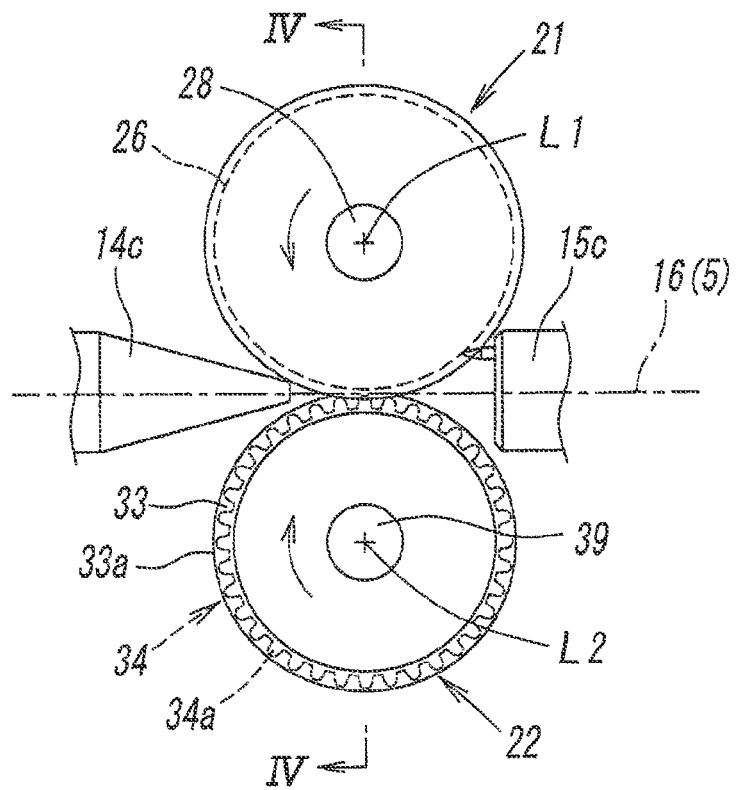
FIG. 3 is an enlarged view of the relevant portion of FIG. 2.
Figure 4:
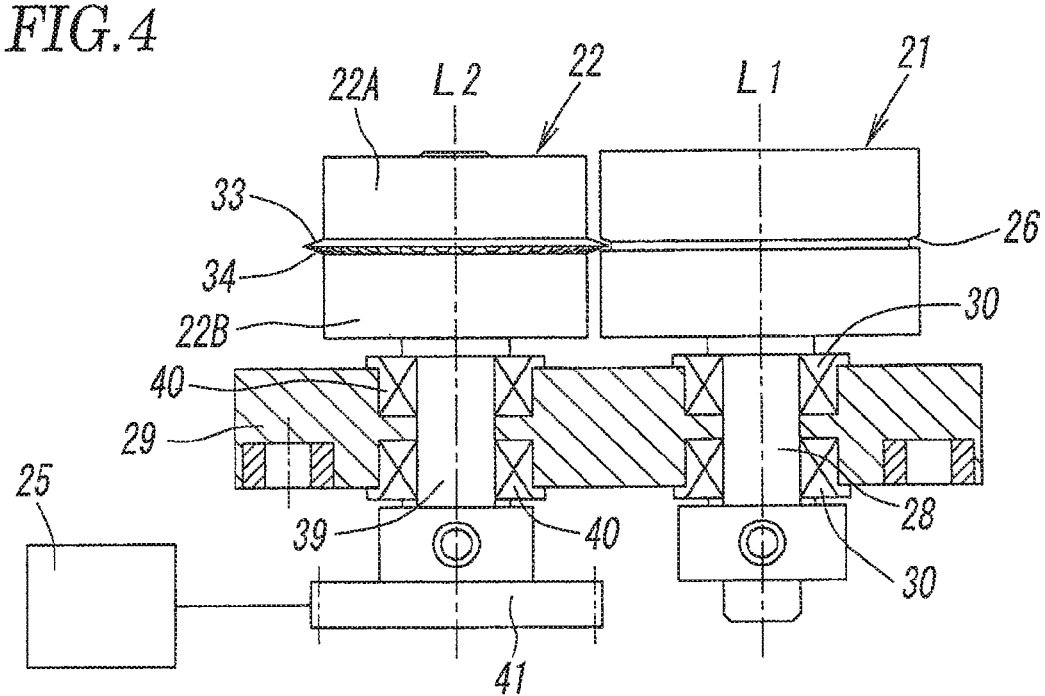
FIG. 4 is a cross-sectional view along a IV-IV line of FIG. 3.

As seen in FIGS. 3 and 4, a first roller 21 is provided in a space between the inlet nozzle 14 and the outlet nozzle 15 and arranged on any one of the left and right sides of the transfer path 16 so as to freely rotate about a first axis line L1 perpendicular to the transfer path 16. On the other side of the transfer path 16, a second roller 22 with a smaller diameter than the first roller 21 is provided so as to freely rotate about a second axis line L2 parallel to the first axis line L1. Moreover, an electric motor 25 which drives and rotates the second roller 22 in forward and backward directions, and is accommodated inside the case 1 in the state of being fixed to the lid plate 10. The electric motor 25 is preferably a stepping motor.

Figure 5:
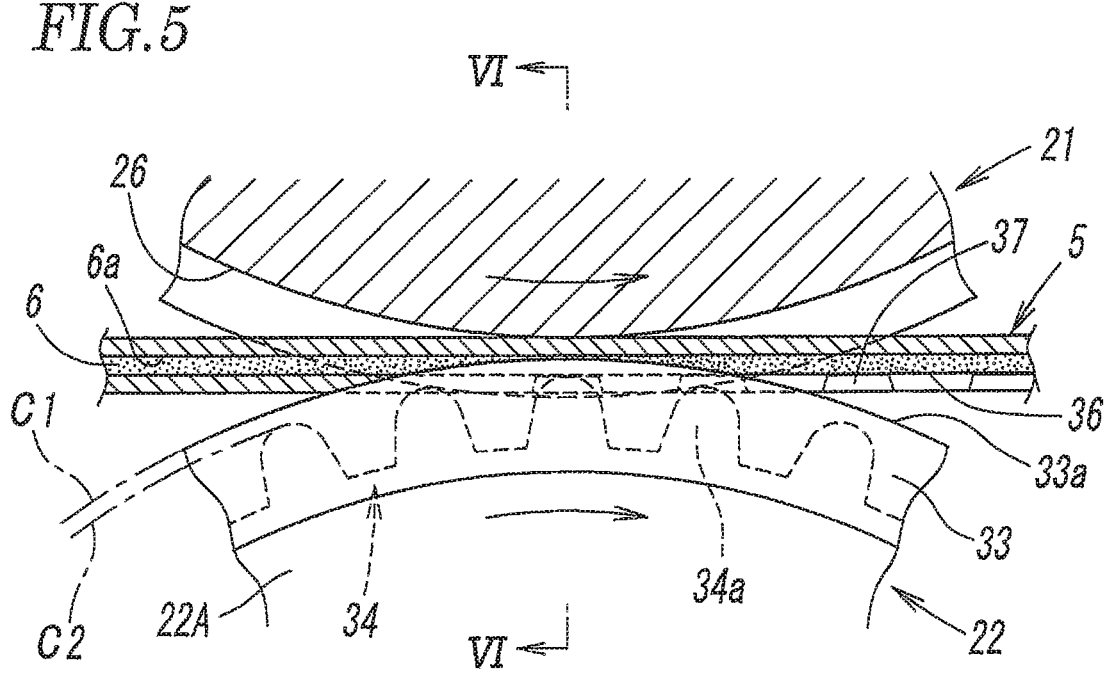
FIG. 5 is a partial enlarged cross-sectional view showing a portion in which two rollers of FIG. 3 face each other.
Figure 6:
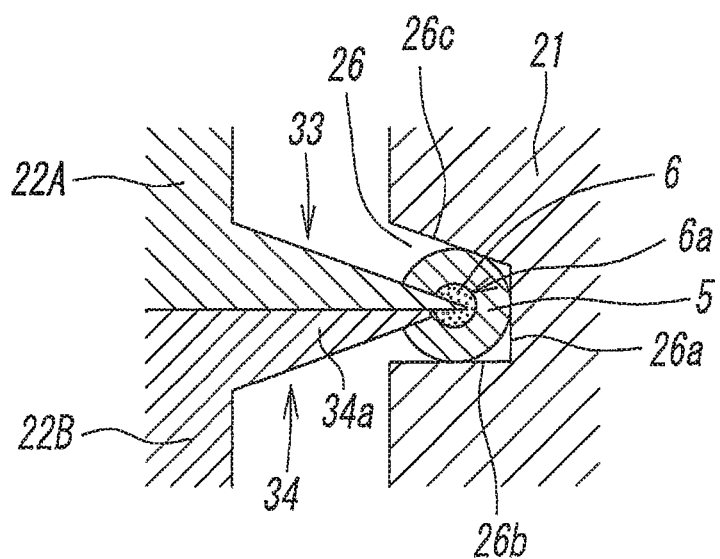
FIG. 6 is an enlarged cross-sectional view along a VI-VI line of FIG. 5.
Figure 7:
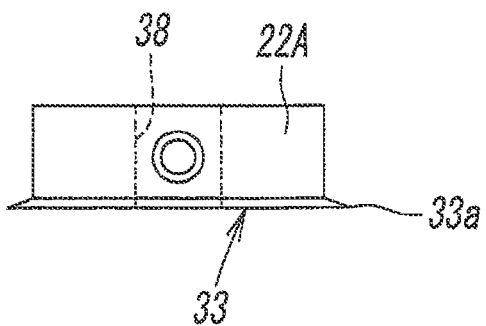
FIG. 7 is a side view of a grooving roller constituting a second roller.
Figure 8:
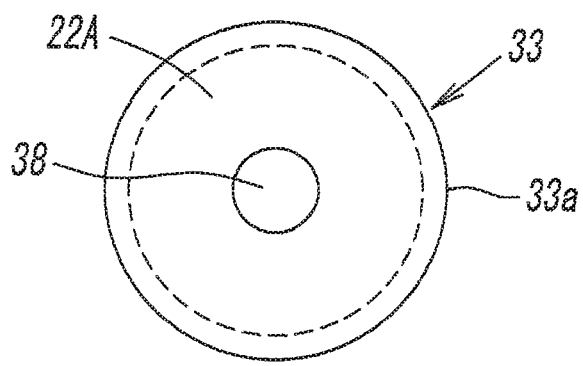
FIG. 8 is a bottom view of FIG. 7.
Figure 9:
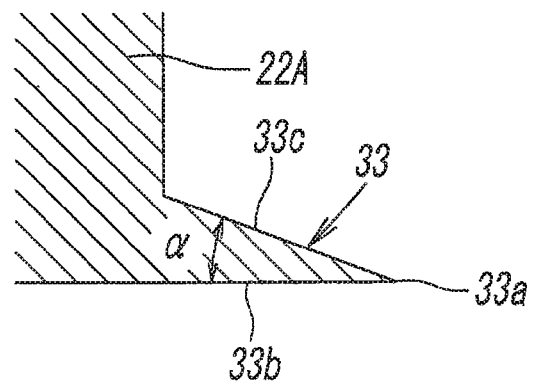
FIG. 9 is an enlarged cross-sectional view of the relevant portion of FIG. 7.
Figure 10:
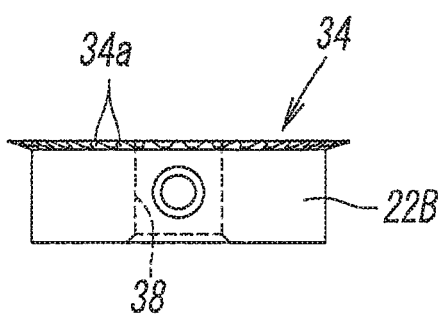
FIG. 10 is a side view of a feed roller constituting the second roller.
Figure 11:
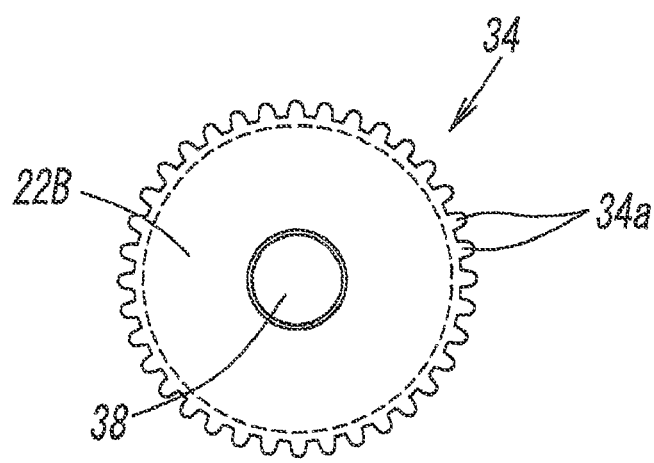
FIG. 11 is a top plan view of FIG. 10.
Figure 12:
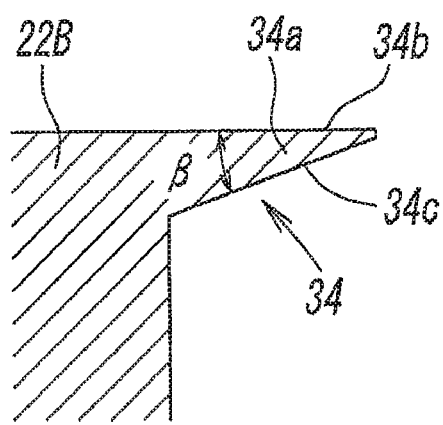
FIG. 12 is an enlarged cross-sectional view of the relevant portion of FIG. 10.

The first roller 21 has on its outer circumference a guide groove 26 in which the wire solder 5 is fitted. As shown in FIGS. 5 and 6, the guide groove 26 has a trapezoid shape and has a back wall 26a parallel to the first axis line L1, a first side wall 26b defined by a plane perpendicular to the first axis line L1, and a second side wall 26c inclined so that the groove width is gradually reduced toward the back wall 26a. The wire solder 5 with a circular cross-section is fitted in the guide groove 26 so as not to protrude from the guide groove 26. The wire solder 5 is guided by the inclined second side wall 26c to always occupy a position closer to the back wall 26a and is abutted against the back wall 26a, the first side wall 26b, and the second side wall 26c at this position to be positioned.

However, the first side wall 26b may be inclined so that the groove width is gradually reduced toward the bottom of the groove, as with the second side wall 26c.

Alternatively, the guide groove 26 may be formed into a V-shape.

A first roller shaft 28 is fixed to the center of the first roller 21. The lower end of the first roller shaft 28 is rotatably attached to a roller support plate 29, removably attached onto the bedplate 11, through bearings 30, whereby the first roller 21 is rotated in forward and backward directions in accordance with the advancing and the retracting movement of the wire solder 5.

Meanwhile, the second roller 22 has a grooving blade 33 for grooving the side surface of the wire solder 5 and a feed blade 34 which engages the wire solder 5 to advance and retract the wire solder 5. The grooving blade 33 and the feed blade 34 are arranged so as to be adjacent above and below along the second axis line L2 and adhered firmly to each other. The specific constitution of the second roller 22 will be described as follows.

Namely, as seen in FIGS. 7 to 10, the second roller 22 is consisted of an upper grooving roller 22A and a lower feed roller 22B which are in contact with each other. The ring-shaped grooving blade 33 is integrally provided at the lower end portion of the grooving roller 22A in a state of protruding outward from the outer circumference of the grooving roller 22A. The ring-shaped feed blade 34 is integrally provided at the upper end portion of the feed roller 22B in a state of protruding outward from the outer circumference of the feed roller 22B. The grooving roller 22A and the feed roller 22B have the same diameter, but they may have different diameters.

The thickness of the grooving blade 33 is gradually reduced from the inner circumferential side toward the outer circumferential side, so that the grooving blade 33 has on its entire circumference a blade edge 33a sharply pointed outward. By virtue of the blade edge 33a, a groove 36 (see, FIGS. 5, 6, and 13) is continuously cut into the side surface of the wire solder 5. Thus, the grooving blade 33 is a continuous blade having the blade edge 33a continuing in the circumferential direction of the second roller 22.

The lower surface of the grooving blade 33, that is, a contact surface 33b in contact with the feed blade 34 is a plane at right angles to the second axis line L2. Meanwhile, the upper surface of the grooving blade 33, that is, an outer surface 33c on the opposite side of the contact surface 33b is an inclined surface gradually inclining in a direction approaching the contact surface 33b toward the blade edge 33a and is a conical surface. In the illustrate example, although an angle formed by the outer surface 33c and the contact surface 33b is 20 degrees, the angle is not limited to 20 degrees, and the preferred angle range is about 15 to 25 degrees.

The lower end surface of the grooving roller 22A is located in the same plane as the contact surface 33b of the grooving blade 33.

Meanwhile, the feed blade 34 is a gear-shaped intermittent blade and has a plurality of engaging claws 34a intermittently formed at a constant pitch in the circumferential direction of the feed blade 34. The engaging claws 34a bite into and engage the side surface of the wire solder 5 to thereby advance and retract the wire solder 5. Thus, the engaging claws 34a are formed at such a pitch that at least one engaging claw 34a bites into the side surface of the wire solder 5 even if the feed blade 34 is located at any rotating positions.

Figure 13:
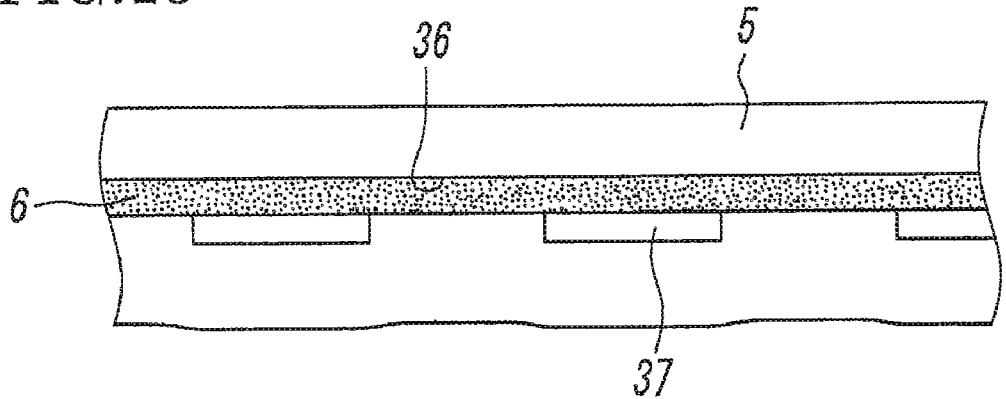
FIG. 13 is a partial side view showing a state in which a continuous groove and intermittent recesses are formed in a side surface of wire solder by the grooving supply device of the present invention.

The shape of the tip end of the engaging claw 34a (the shape of the blade edge) is an arc shape free of corners, whereby in the transfer of the wire solder 5, the engaging claw 34a smoothly bites into and separates from the side surface of the wire solder 5 without chipping off the wire solder 5, and therefore, the generation of cutting chips is pre'vented. By virtue of the intermittent bite of the engaging claw 34a, recesses 37 are intermittently formed in the side surface of the wire solder 5 as shown in FIG. 13.

The top surface of the feed blade 34, that is, a contact surface 34b in contact with the grooving blade 33 is a plane at right angles to the second axis line L2. Meanwhile, the lower surface of the feed blade 34, that is, an outer surface 34c on the opposite side of the contact surface 34b is an inclined surface gradually inclining in a direction approaching the contact surface 34b toward the tip end side of the engaging claw 34a and is a conical surface. Thus, the lower surfaces of all the engaging claws 34a, that is, the outer surfaces 34c are parts of one common conical surface. In the illustrated example, although an angle β formed by the outer surface 34c and the contact surface 34b is 20 degrees, the angle is not limited to 20 degrees, and the preferred angle range is about 15 to 25 degrees.

The upper end surface of the feed roller 22B is located in the same plane as the contact surface 34b of the feed blade 34.

The grooving roller 22A and the feed roller 22B are fixed to a common second roller shaft 39, fitted in the respective center holes 38 of the rollers 22A and 22B, by a set screw in such a state that the contact surfaces 33b and 34b of the grooving blade 33 and the feed blade 34, respectively, are adhered firmly to each other, whereby the second roller 22 is assembled.

As described above, the second roller 22 is provided with both the grooving blade 33 and the feed blade 34, whereby the second roller 22 can have both a function of grooving the wire solder 5 and a function of feeding the wire solder 5, and consequently, the grooving supply device can have a very simple and rational design structure.

The grooving blade 33 and the feed blade 34 can be disposed in the direction reverse to that in the above case. In this case, the grooving roller 22A is disposed on the lower side of the feed roller 22B so that the grooving blade 33 is directed upward, and the feed roller 22B is disposed on the upper side of the grooving roller 22A so that the feed blade 34 is directed downward.

As shown in FIG. 4, the lower end of the second roller shaft 39 is supported by the roller support plate 29 through bearings 40 and extends into the case 1, and a driven gear 41 is attached to the lower end. As shown in FIG. 1, the driven gear 41 meshes with a driving gear 42 at a tip end of an output shaft 25a of the electric motor 25, and by virtue of the electric motor 25, the second roller 22 is driven and rotated by only a necessary rotation angle in forward and backward directions through the gears 41 and 42.

As seen in FIG. 5, a blade-edge circle C2 connecting the tip ends of the engaging claws 34a of the feed blade 34 and a blade-edge circle C1 formed by the blade edge 33a of the grooving blade 33 do not have the same diameter, and the blade-edge circle C2 in the feed blade 34 has a smaller diameter than the blade-edge circle C1. According to this constitution, the bite of the engaging claw 34a is shallowed, and the deformation of the wire solder 5 can be further reduced. Namely, when the wire diameter of the wire solder 5 is small (for example, not more than 1 mm), the engaging claw 34a bites into the wire solder 5, whereby the wire solder 5 is pressed and extended laterally by the biting portion to be partially deformed, and thus the transfer of the wire solder 5 is apt to be hampered. However, when the diameter of the blade-edge circle C2 of the feed blade 34 is reduced as described above, the bite of the engaging claw 34a can be shallowed as possible within a range effective for transfer of the wire solder 5. Thus, the deformation of the wire solder 5 can be reduced to such an extent that the transfer of the wire solder 5 is not interfered. The first roller 21 and the second roller 22 are disposed in such a positional relation that the blade edge 33a of the grooving blade 33 reaches a flux-containing region 6a of the wire solder 5, whereby the groove 36 having a depth reaching the flux-containing region 6a is cut into the side surface of the wire solder 5 by means of the grooving blade 33.

At that time, the engaging claw 34a of the feed blade 34 may be located at such a position that the tip end of the engaging claw 34a reaches the flux-containing region 6a, but it is preferable that the engaging claw 34a occupies such a position that the tip end of the engaging claw 34a does not reach the flux-containing region 6a.

The tip end of the engaging claw 34a, that is, the blade edge may be pointed sharply equally to the blade edge 33a of the grooving blade 33; however, in the illustrated example, as seen in FIG. 6, since the blade-edge circle C2 formed by the engaging claws 34a has a smaller diameter than the blade-edge circle C1 of the grooving blade 33, the blade edge of the engaging claw 34a is formed to be slightly thicker than the blade edge 33a of the grooving blade 33.

The first and second rollers 21 and 22 are fixed in the positional relationship in accordance with the wire diameter of wire solder to be used, and their positions cannot be adjusted. Thus, when wire solders with different wire diameters are used, it is necessary to remove the roller support plate 29 and to attach a different roller support plate attached with the rollers 21 and 22 in accordance with the wire diameter of the wire solder which one plans to use. However, at least one position of the first and second rollers 21 and 22 may be adjustable in accordance with the wire diameter of the wire solder 5.

An operating switch 44 of FIG. 2 turns on off the electric motor 25. When the operating switch 44 is turned on, the electric motor 25 rotates in the forward direction to rotate the second roller 22 in the arrow direction of FIG. 2. When the operating switch 44 is turned off, the electric motor 25 stops to stop the second roller 22 at the rotational position of the time.

However, the operating switch 44 may be constituted so that when the operating switch 44 is fallen on one side, the electric motor 25 rotates forward, when the operating switch 44 is fallen on the other side, the electric motor 25 rotates backward, and when the operating switch 44 is in a neutral position, the electric motor 25 stops.

When the grooving supply device having the above constitution starts to be used, in such a state that the operating switch 44 is turned off, the tip end of the wire solder 5 drawn from the solder reel 4 is inserted through the solder-inserted hole 14b of the inlet nozzle 14 to be fed in between the first roller 21 and the second roller 22 in the guide groove 26.

Then, the operating switch 44 is turned on to rotate the second roller 22 in the arrow direction shown in FIGS. 2 and 3 only by a required rotation angle, whereby the engaging claw 34a of the feed blade 34 bites into the side surface of the wire solder 5 to advance the wire solder 5, and, at the same time, the wire solder 5 is inserted through the solder-inserted hole 15b of the outlet nozzle 15, thereafter, the operating switch 44 is turned off.

When the grooving supply device is used for manual soldering, the operating switch 44 is turned on/off from the above state, whereby a necessary amount of the wire solder 5 is fed from the outlet nozzle 15 in sequence to be melted by the tip of a soldering iron, and, thus, to perform soldering.

At that time, the engaging claw 34a of the feed blade 34 of the second roller 22 bites into and engages the wire solder 5 to thereby feed the wire solder 5, and the wire solder 5 is grooved by the grooving blade 33 of the second roller 22. Thereby, as shown in FIG. 13, the groove 36 having a depth reaching the flux-containing region 6a is cut into the side surface of the wire solder 5 by the grooving blade 33, and, at the same time, the recesses 37 are intermittently formed by the bite of the feed blade 34. The first roller 21 rotates in accordance with the movement of the wire solder 5.

The wire solder 5 is fed (advanced) mainly by the engaging claws 34a of the feed blade 34, but, at the same time, since the frictional force upon grooving by the grooving blade 33 acts as a thrust force in the transfer direction, the wire solder 5 is very smoothly transferred, and a necessary amount of the wire solder 5 is reliably and stably supplied toward an object to be soldered.

The groove 36 having a depth reaching the flux-containing region 6a is cut into the side surface of the wire solder 5, and therefore, even when the flux 6 is heated at the time of soldering by a soldering tip to be rapidly evaporated, the flux 6 is transpired from the groove 36, so that an explosion phenomenon never occurs.

Meanwhile, when the grooving supply device is attached to an automatic soldering machine such as a robot and soldering is automatically performed, first, the operation till the wire solder 5 is led out from the tip end of the outlet nozzle 15 is manually performed using the operating switch 44. Thereafter, while the operating switch 44 is turned off, soldering is automatically performed under automatic control of the grooving supply device (more specifically, the electric motor 25) by a controller in the automatic soldering machine.

Alternatively, the operation till the wire solder 5 is guided to the inlet nozzle 14 is manually performed, and the operation following the above operation may be automatically performed by the controller.

When the wire solder 5 is supplied toward the tip of a soldering iron, the electric motor 25 rotates only by a required rotation angle in the forward direction, whereby the second roller 22 rotates in the forward direction only by the corresponding rotation angle, and a necessary amount of the wire solder 5 is accurately fed by the feed blade 34. Then, the wire solder 5 is melted by the soldering tip, and soldering is performed.

After one soldering point is soldered, a robot arm, that is, a soldering iron is moved for the next soldering. In order to prevent the wire solder 5 from being melted by the heat of the soldering tip before soldering the next soldering point, the wire solder 5 is retracted by a constant distance (for example, 3 to 5 mm) to be separated from the soldering tip. At that time, the electric motor 25 rotates in the backward direction only by a required rotation angle, whereby the second roller 22 rotates backward only by the corresponding rotation angle, and the wire solder 5 is retracted only by a required distance by the feed blade 34.

At that time, since some engaging claws 34a of the feed blade 34, which are in a state of biting into and engaging the wire solder 5, rotate backward, a slip does not occur between the feed blade 34 and the wire solder 5, and the wire solder 5 is accurately retracted only by a necessary amount. Moreover, the engaging claw 34a already separated from the wire solder 5 is fitted in and engages the recess 37 again to reliably retract the wire solder 5.

Meanwhile, although the grooving blade 33 rotates with the feed blade 34, the grooving blade 33 just goes around in the groove 36 having been cut by the grooving blade 33, and thus it does not affect the retraction of the wire solder 5.

In the above embodiment, although the second roller 22 is formed by connecting to each other the grooving roller 22A including the grooving blade 33 and the feed roller 22B including the feed blade 34, the second roller 22 may include the grooving blade 33 and the feed blade 34 integrally provided at the outer circumference of one roller.

Alternatively, the grooving blade 33 and the feed blade 34 are separately formed as disc-shaped members, and they are held between two fixing members, constituted by rollers and so on, while being overlapped with each other, whereby the second roller 22 can be formed. In this case, the grooving blade 33 and the feed blade 34 can be integrally formed at the outer circumference of one disc-shaped member.

In the above embodiment, the blade-edge circle C2 of the feed blade 34 has a smaller diameter than the blade-edge circle C1 of the grooving blade 33, however, when the wire diameter of the wire solder 5 is relatively large (for example, not less than 1 mm), since the ratio of the deformation due to the bite of the engaging claw 34a of the feed blade 34 is reduced, the blade-edge circle 2 in the feed blade 34 can have the same diameter as the blade-edge circle C1 of the grooving blade 33.

Further, the shape of the tip end of the engaging claw 34a of the feed blade 34 is not necessarily a circular arc, but may be a shape having a blade edge along the blade-edge circle C2 like teeth of a general spur wheel, or may be a sawtooth shape.

Furthermore, although the first roller 21 is rotated in accordance with the movement of the wire solder 5, the first roller 21 may be driven and rotated synchronized with the second roller 22 by the electric motor 25.

What is claimed is:
1. A grooving supply device for flux cored wire solder, comprising:
    a first roller which is provided on one side of a transfer path for transferring flux cored wire solder and arranged rotatably about a first axis line perpendicular to the transfer path; and a second roller which is provided on the other side of the transfer path and arranged rotatably about a second axis line parallel to the first axis line, wherein the first roller has on its outer circumference a guide groove in which the wire solder is fitted, the second roller has a grooving blade for grooving a side surface of the wire solder and a feed blade, which engages the wire solder so as to advance and retract the wire solder, the grooving blade and the feed blade being adjacent to each other along the second axis line, and the grooving blade has a continuous circular blade edge on its outer circumference surrounding the circumference of the second roller, and the feed blade has on its outer circumference engaging claws intermittently formed at a constant pitch.

2. The grooving supply device according to claim 1, wherein a diameter of the feed blade extending to tip ends of the engaging claws is smaller than a diameter of a blade-edge circle formed by the blade edge of the grooving blade.

3. The grooving supply device according to claim 1, wherein the grooving blade and the feed blade are arranged in a state of being in close contact with each other.

4. The grooving supply device according to claim 2, wherein the grooving blade and the feed blade are arranged in a state of being in close contact with each other.

5. The grooving supply device according to claim 3, wherein the grooving blade and the feed blade are separately formed, respective contact surfaces of the grooving blade and the feed blade, which are in contact with each other, are planes perpendicular to the first axis line or the second axis line, and respective outer surfaces of the grooving blade and the feed blade, which are on an opposite side of the contact surfaces, gradually incline in a direction approaching the contact surfaces toward the blade edge.

6. The grooving supply device according to claim 4, wherein the grooving blade and the feed blade are separately formed, respective contact surfaces of the grooving blade and the feed blade, which are in contact with each other, are planes perpendicular to the first axis line or the second axis line, and respective outer surfaces of the grooving blade and the feed blade, which are on an opposite side of the contact surfaces, gradually incline in a direction approaching the contact surfaces toward the blade edge.

7. The grooving supply device according to claim 5, wherein the second roller comprises a grooving roller and a feed roller which are disposed concentrically with the respective tip end surfaces thereof being in contact with each other, the grooving blade is formed at an end portion on a side of the tip end surface of the grooving roller, and the feed blade is formed at an end portion on a side of the tip end surface of the feed roller.

8. The grooving supply device according to claim 6, wherein the second roller comprises a grooving roller and a feed roller which are disposed concentrically with the respective tip end surfaces thereof being in contact with each other, the grooving blade is formed at an end portion on a side of the tip end surface of the grooving roller, and the feed blade is formed at an end portion on a side of the tip end surface of the feed roller.

9. The grooving supply device according to claim 5, wherein an angle formed by the contact surface and the outer surface of the grooving blade and an angle formed by the contact surface and the outer surface of the feed blade are equal to each other.

10. The grooving supply device according to claim 6, wherein an angle formed by the contact surface and the outer surface of the grooving blade and an angle formed by the contact surface and the outer surface of the feed blade are equal to each other.

11. The grooving supply device according to claim 1, wherein the shape of the tip end of the engaging claw of the feed blade is a circular arc.

12. The grooving supply device according to claim 1, wherein a diameter of the feed blade extending to tip ends of the engaging claws is equal to a diameter of a blade-edge circle formed by the blade edge of the grooving blade.

* * * * *